US010909285B2

United States Patent
Pillekeit (10) Patent No.: US 10,909,285 B2
(45) Date of Patent: Feb. 2, 2021

(54) METHOD FOR CREATING A MODEL COMPATIBLE WITH A SIMULATION DEVICE

(71) Applicant: dSPACE digital signal processing and control engineering GmbH, Paderborn (DE)

(72) Inventor: Andreas Pillekeit, Dortmund (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 441 days.

(21) Appl. No.: 15/845,272

(22) Filed: Dec. 18, 2017

(65) Prior Publication Data

US 2018/0173831 A1    Jun. 21, 2018

(30) Foreign Application Priority Data

Dec. 16, 2016    (DE) .......................... 10 2016 124 623

(51) Int. Cl.
*G06F 30/33*    (2020.01)
*G06F 9/54*    (2006.01)
(Continued)

(52) U.S. Cl.
CPC ............ *G06F 30/33* (2020.01); *G05B 17/02* (2013.01); *G06F 8/10* (2013.01); *G06F 9/455* (2013.01);
(Continued)

(58) Field of Classification Search
CPC . G06F 30/33; G06F 30/20; G06F 8/10; G06F 9/455; G06F 9/45533; G06F 9/541;
(Continued)

(56) References Cited

U.S. PATENT DOCUMENTS 5,504,922 A * 4/1996 Seki .......................... G06F 3/023
                                                                 703/25
8,296,118 B1 * 10/2012 Wolodkin ................ G06F 30/33
                                                                 703/13

(Continued)

FOREIGN PATENT DOCUMENTS

| EP | 2 801 872 A1 | 11/2014 |
| EP | 2 871 544 A2 | 5/2015 |
| EP | 3 001 313 A1 | 3/2016 |

OTHER PUBLICATIONS (Olaf Enge-Rosenblatt et. al., Functional Digital Mock-up and the Functional Mock-up Interface—Two Complementary Approaches fora Comprehensive Investigation of Heterogeneous Systems, Proceedings 8th Modelica Conference, Dresden, Germany, Mar. 20-22, 2011, pp. 748-755) (Year: 2011).*

(Continued)

*Primary Examiner* — Justin C Mikowski
(74) *Attorney, Agent, or Firm* — Muncy, Geissler, Olds & Lowe, P.C.

(57) ABSTRACT

A method for creating a model of a technical system, is provided, the model being compatible with a simulation device. The simulation device is a simulation device set up for control unit development and the compatible model is executable on the simulation device. The method includes: providing a simulation-device-incompatible model of the technical system; providing a virtual execution environment, wherein the simulation-device-incompatible model of the technical system is executable in the virtual execution environment; and encapsulating the simulation-device-incompatible model of the technical system and the virtual execution environment in a compatible container unit forming the compatible model of the technical system. The incompatible model of the technical system can be address- (Continued)

able via the compatible container unit and the virtual execution environment on simulation device.

15 Claims, 3 Drawing Sheets

(51) Int. Cl.
| | |
|---|---|
| *G06F 9/455* | (2018.01) |
| *G06F 8/10* | (2018.01) |
| *G06F 11/36* | (2006.01) |
| *G05B 17/02* | (2006.01) |
| *G06F 30/20* | (2020.01) |
| *G06F 117/08* | (2020.01) |

(52) U.S. Cl.
CPC .......... *G06F 9/45533* (2013.01); *G06F 9/541* (2013.01); *G06F 11/3664* (2013.01); *G06F 30/20* (2020.01); *G06F 2117/08* (2020.01)

(58) Field of Classification Search
CPC .. G06F 11/3664; G06F 2117/08; G05B 17/02
USPC .......................................................... 703/13
See application file for complete search history.

(56) References Cited

U.S. PATENT DOCUMENTS

| | | | | |
|---|---|---|---|---|
| 8,630,829 | B1* | 1/2014 | Gaudette | G06F 30/20 |
| | | | | 703/6 |
| 8,813,051 | B2 | 8/2014 | Dawson et al. | |
| 8,868,396 | B1* | 10/2014 | Shirazi | G06F 30/33 |
| | | | | 703/14 |
| 9,766,607 | B2 | 9/2017 | Franzen et al. | |
| 9,886,294 | B2 | 2/2018 | Holler | |
| 2009/0306952 | A1* | 12/2009 | Kajitani | G06F 30/33 |
| | | | | 703/13 |
| 2014/0214393 | A1* | 7/2014 | Kim | G06F 30/20 |
| | | | | 703/13 |
| 2014/0236560 | A1* | 8/2014 | Brehm | G06F 11/2289 |
| | | | | 703/13 |
| 2015/0019191 | A1* | 1/2015 | Maturana | G06F 30/20 |
| | | | | 703/13 |
| 2015/0039283 | A1* | 2/2015 | Ruehl | G06F 30/00 |
| | | | | 703/13 |
| 2015/0134317 | A1* | 5/2015 | Maturana | G05B 17/02 |
| | | | | 703/13 |
| 2017/0331699 | A1* | 11/2017 | Lee | G05B 17/02 |

OTHER PUBLICATIONS

Memduha Aslan, An Object-Oriented Framework for Functional Mock-Up Interface Co-Simulation, M.S., Department of Computer Engineering, Feb. 2016, 89 pages. (Year: 2016).*
Seyed-Hosein Attarzadeh-Niaki and Ingo Sander, Integrating Functional Mock-up Units into a Formal Heterogeneous System Modeling Framework, 2015 18th CSI International Symposium on Computer Architecture and Digital Systems (CADS) pp. 1-6 (Year: 2015).*
Fabio Cremona et. al., FIDE—An FMI Integrated Development Environment, SAC 2016, Apr. 4-8, 2016, Pisa, Italy, pp. 1759-1766 (Year: 2016).*
Extended European Search Report for European Application No. 17204564.3 dated May 9, 2018 with English translation.
German Office Action for German Application No. 102016124623.9 dated Sep. 27, 2017 with English translation.
Luke et al., "Replacement Strategy for Aging Avionics Computers," IEEE Aerospace & Elec. Sys., vol. 14, No. 3, pp. 7-11 (1999).
Delaitre et al., "GEMLCA: running legacy code applications as grid services," J. of Grid Comp., vol. 3, No. 1-2, pp. 75-90 (2005).
Bouchhima et al, "A SystemC/Simulink Co-Simulation Framework for Continuous/Discrete-Events Simulation," Proc. of IEEE Behav. Model. & Simul. Workshop, pp. 1-6 (2006).
Modelica, "Functional Mock-up Interface for Model Exchange and Co-Simulation," Specification Ver. 2.0, pp. 1-126 (Jul. 25, 2014).

* cited by examiner

METHOD FOR CREATING A MODEL COMPATIBLE WITH A SIMULATION DEVICE

This nonprovisional application claims priority under 35 U.S.C. § 119(a) to German Patent Application No. 10 2016 124 623.9, which was filed in Germany on Dec. 16, 2016, and which is herein incorporated by reference.

BACKGROUND OF THE INVENTION

Field of the Invention

The present invention relates to the development of control units as they are used, e.g., in the automotive industry or in the aviation industry for controlling technical systems such as, e.g., engines or brakes. The present invention relates in particular to simulation devices used in the control unit development process.

Description of the Background Art

The development of control units has become a highly complex process. New control units or new control functions should thus be tested as early in the development process as possible in order to verify general functionality and to set the direction for further development. Towards the end of the development process, it is important to test the control unit, which has already undergone extensive development, as comprehensively as possible in order to make necessary modifications based on the test results before the control unit comes into use or enters mass production so that it functions as desired under all conditions in later operation. Three exemplary steps of the development process are described below.

So-called hardware-in-the-loop simulators (HIL simulators) are used at a very late stage of the development process. Such HIL simulators contain a model of the technical system to be controlled, the model being present in the software. The HIL simulator also contains an input/output interface to which the control unit, which has already undergone extensive development and is already physically present in the hardware, also referred to as a hardware implementation of the control unit, can be connected. The functionality of the control unit can now be tested in various simulation runs, wherein it is possible to observe how the model of the technical system to be controlled reacts to the signals of the control unit, and how the control unit reacts to the events predefined by the model of the technical system to be controlled. In this process, it is possible to simulate both normal operation and faults in the technical system to be controlled as well as faults in the control unit, as well as faults in the communication between the control unit and the system to be controlled, such as, e.g., a cable bridge, as well as faults in the power supply, such as, e.g., short circuits. The HIL simulator is an example of a simulation device set up for control unit development.

In contrast, the so-called rapid control prototyping (RCP) is a development step that takes place more toward the start of the development process. In RCP, the simulation device is used in the role of the control unit. The simulation device contains a test model of the control unit. Because of the early stage of development, the test model of the control unit is still fairly rudimentary in comparison with the later final control unit. Nor is any hardware implementation of the control unit normally in existence yet; instead, the control unit test model that is present in the simulation device is a software model. The simulation device can be connected via an input/output interface to the technical system to be controlled itself or to the control unit that exists to date for the technical system to be controlled. In the first case, there is a direct connection between the control unit to be tested, in the form of a software model, and the technical system to be controlled, which is physically present. In the second case, the control unit that exists to date is the technical system to be controlled by the RCP simulation device. This control of the control unit that exists to date results in a modification of the control method of the control unit that exists to date, making it possible to test a new control functionality by means of the externally connected RCP simulation device. This process can also be referred to as "bypassing." The RCP simulation device is another example of a simulation device set up for control unit development.

In a still earlier phase of control unit development, the basic functionality of control and regulation methods can be evaluated on a purely computer-aided basis. For this purpose, a basic test model of the control unit is created in software, which can be tested without a physical connection to the technical system to be controlled. The test can be carried out in this phase in such a way that the behavior of the basic test model as such, i.e., the internal states of the basic test model, or the behavior of the basic test model in interaction with a computer-based model of the later environment of the control unit is observed and evaluated. There are computer-based development environments, such as, e.g., Simulink®, for creating basic test models of control units and of the mentioned models of the control unit environment. Such development environments also allow testing of the basic test models in the modeled environment. For detailed tests of basic test models in modeled environments, there are in turn specialized products, such as, e.g., VEOS®. Computers equipped with such development environments are further examples of simulation devices set up for control unit development. The mentioned basic test models of control units are also referred to as virtual control units, so-called "Virtual Electronic Control Units" (V-ECUs), especially in the field of control unit development in the automotive industry. In addition to the testing of basic functionality of control and regulation methods in an early phase of control unit development, basic test models can also be used to move up certain tests of HIL simulations, and thus to keep the test scope small during the HIL test phase.

In the mentioned simulation devices, a model of a technical system to be controlled is connected to a control unit or a model of a control unit, which can also be a basic test model, for example, or it is connected to a technical system to be controlled or a model of a control unit to be controlled is connected to a model of a technical system to be controlled, also referred to as the environment model(s). This usually entails considerable configuration effort for the preparation of a simulation. The configuration effort is further increased by the fact that in many simulations not only the mentioned two units/models are connected to each other but further models are incorporated. One example is a test of an engine control unit connected to an HIL simulator on which a model of the engine is run with which the engine control unit interacts. In addition, one or more further models of technical systems can be executed on the HIL simulator, e.g., a model of a transmission, the interaction with the additional model(s) being included in the simulation. In addition to the effort for the configuration, the often desired consideration of many models increases the risk that some models are not compatible with the simulation device and therefore cannot be incorporated.

SUMMARY OF THE INVENTION

Consequently, it would be desirable to broaden the possibilities for incorporating models of technical systems and to enable effective access to the models of technical systems during the simulation.

Exemplary embodiments of the invention comprise a method for creating a model of a technical system, said model being compatible with a simulation device, wherein the simulation device is a simulation device set up for control unit development and the compatible model is executable on the simulation device, wherein the method comprises the following steps: (a) providing a simulation-device-incompatible model of the technical system; (b) providing a virtual execution environment, wherein the simulation-device-incompatible model of the technical system is executable in the virtual execution environment; and (c) encapsulating the simulation-device-incompatible model of the technical system and the virtual execution environment in a compatible container unit forming the compatible model of the technical system, wherein the incompatible model of the technical system is addressable via the compatible container unit and the virtual execution environment on the simulation device.

The method of the invention makes it possible to adapt or prepare technical system models that are incompatible with a specific simulation device and are to be incorporated into a simulation, e.g., as environment models, so that they become compatible with the simulation device and can become part of a simulation in control unit development. In this way, the pool of models of technical systems available for a particular simulation is no longer limited to inherently compatible models. The set of embeddable models of technical systems is expanded by existing models that were incompatible in their original form.

Models of technical systems can be incompatible with a particular simulation device for a variety of reasons. For example, a model may exist in a precompiled form and therefore is executable only on a particular operating system or on a particular type of operating system. If the simulation device then has no such operating system, the model is incompatible with the simulation device. The same can also apply to models which require a specific processor or a specific type of processor and/or a specific memory or a specific type of memory for execution. By providing a virtual execution environment and encapsulating the incompatible model and virtual execution environment in a compatible container unit, the originally incompatible model becomes executable and addressable on the simulation device. The compatible model of the technical system is compatible with the circumstances of the simulation device, such as, e.g., the operating system, processor, and memory.

The incompatible model may be, for example, a binary code or machine code of an executable technical model. The binary code or the machine code can also be called a compilation. Accordingly, the incompatible model may also be referred to as a compile of a model. The compile is created by compiling a model written in a high-level language such as C, C++, Java or a graphical programming language that exists for a particular target platform with a particular processor architecture or operating system. Exemplary processor architectures may be, for example, e.g. IA-32, x86, IA64, x64, ARM, PowerPC or SPARC. Exemplary operating systems may be, for example, Windows, Linux, Unix or QNX. Thus, in a very specific application, an incompatible model may be a model compiled for a QNX operating system running on an x86 architecture processor, whereby the model is, for example, a model of a vehicle engine.

By the method of the invention, incompatible models of technical systems are made compatible for execution on a simulation device. For the preparation of a simulation or a test, this can mean a considerable reduction of the effort or preparation time. Precompiled and/or encrypted models of technical systems that are executable only in selected execution environments are widely used. One of the reasons for this is that many manufacturers of certain components, such as, e.g., suppliers in the automotive industry, only provide precompiled and/or encrypted models of their components for simulation purposes. In this way, the manufacturers of the components want to protect the details of their products. Due to the method of the invention, it is now no longer necessary to have a compatible model, made for a specific simulation in a time-consuming manner, instead of an incompatible model. Rather, the incompatible model can be encapsulated in a compatible container unit and executed via the virtual execution environment. A recompilation of a higher-level language model of the technical system, which often only the manufacturer of the component can provide, can be made superfluous. The effort and time frame for preparing a simulation can thus be reduced.

Examples of simulation devices set up for control unit development are the HIL simulators discussed above, RCP simulation devices, and computers equipped with appropriate development environments. In all of these simulation devices, there may be a need to incorporate different models of technical systems to perform comprehensive tests in control unit development. Thus, the method described herein for creating a simulation-device-compatible model of a technical system may be used in all of these and other suitable simulation devices.

According to a further embodiment, the compatible container unit is designed in accordance with an interface specification that may be standardized. By providing a (standardized) interface, the compatible container unit can be conveniently addressed on the simulation device and conveniently configured during preparation of the simulation. A relatively uncomplicated incorporation of the compatible container unit, which forms the compatible model of the technical system, can be achieved. For the compatible container unit, a generally specified or standardized container format, in particular a standardized container file format, can be provided. According to a further embodiment, the compatible unit may be designed according to the Functional Mock-up Interface (FMI). This interface specializes in the coupling of simulation software, especially software models. The specification for this interface can be found at https://svn.modelica.org/fmi/branches/public/specifications/v2.0/FMI_for_ModelExchange_and_CoSimulation_v2.0.pdf. This embodiment of the invention relates to interfaces that are in accordance with version 2.0 of 25 Jul. 2014 or version 1.0 of 26 Jan. 2010 (FMI for Model Exchange: https://svn.modelica.org/fmi/branches/public/specifications/v1.0/FMI_for_ModelExchange_v1.0.pdf) or 12 Oct. 2010 (FMI for Co-Simulation: https://svn.modelica.org/fmi/branches/public/specifications/v1.0/FMI_for_CoSimulation_v1.0.pdf) and to all previous and/or future specification versions.

According to an embodiment, encapsulation in the compatible container unit comprises coupling the compatible container unit and the virtual execution environment by means of an interface bridge. In this way, the virtual execution environment with which the incompatible model interacts can be effectively connected to the compatible container unit. The interface bridge may be considered as coupling the external interface of the virtual execution environment to the internal interface of the compatible container unit. Thus, an effective encapsulation can be achieved together with effective incorporation. The interface bridge is capable of converting calls between the execution environment of the simulation device, such as, e.g., the operating system of the simulation device, and the virtual execution environment.

According to an embodiment, the virtual execution environment comprises an operating system on which the simulation-device-incompatible model of the technical system is executable. The simulation-device-incompatible model of the technical system is a model compatible with the operating system of the virtual execution environment. Thus, the step between incompatibility and compatibility can be taken by the operating system of the virtual execution environment. The term 'virtual execution environment' generally refers to a software environment that as compared with the incompatible model feels like model-compatible hardware and therefore enables execution of the incompatible model.

According to an embodiment, the virtual execution environment further has a processor and/or a storage medium and/or a local license server. In other words, the virtual execution environment has at least one of the components: processor, storage medium, and local license server. As part of the virtual execution environment, these components are also present virtually, i.e., in software. However, for the executed incompatible model of the technical system, these components look like corresponding hardware components and behave accordingly during the interaction. It is also possible for one or more processors or processor cores and/or dedicated memory modules or memory areas to be assigned to the virtual execution environment on the simulation device. Even if these components are part of the simulation device hardware, they become part of the virtual execution environment by the assignment to the virtual execution environment for the simulation.

According to an embodiment, the virtual execution environment further has hardware components and/or software components required for executing the incompatible model but not present on the simulation device. These hardware components that are not present on the simulation device from the outset may be, e.g., a processor (with a special instruction set) and/or a storage medium which are emulated. The software components that are not present on the simulation device from the outset may be a license mechanism and/or a further simulation environment and/or a database. A license mechanism can thereby provide licenses required by the model, e.g., in the form of a (local) license server. The databases can provide information that the model needs to execute, e.g., parameters of technical systems to be simulated. Another simulation environment or simulation software can be provided in order to be able to simulate models that require special simulation environments for execution that are not on the simulation device, because these models are present in a simulation language or simulation syntax that is not supported by the simulation device from the outset.

According to an embodiment, the incompatible model of the technical system has a precompiled model of the technical system embedded in an output container unit. The output container unit is also referred to as the origin container unit, because it forms the starting format in the creation of the compatible model, with the compatible container unit being the final product executed on the simulation device. Such an output container unit is a format in which models can be conveniently provided. For example, the incompatible model of the technical system may be present precompiled, but the output container unit may be processed more easily than a compilation.

According to an embodiment, the output container unit is designed in accordance with an interface standard. By providing a standardized interface, the output container unit can be conveniently addressed in the virtual execution environment. The fact that the output container unit has a standardized interface does not contradict the fact that the precompiled model of the technical system embedded in the output container unit is incompatible with the simulation device. The output container unit can be an externally standardized, addressable unit, but for the precompiled model of the technical system, it is primarily a transport vehicle from which the precompiled model of the technical system is loaded into an execution environment. Depending on the execution environment, the precompiled model of the technical system may then be incompatible with the execution environment. According to a further embodiment, the output container unit may be designed according to the Functional Mock-up Interface (FMI).

According to an embodiment, the incompatible model of the technical system is an environment model for a control unit. The incompatible model in this case can be a model of a technical system directly addressed by the control unit, in particular a model of a technical system to be controlled. It is also possible, however, that the incompatible model of the technical system is an environment model of the extended environment of the control unit. Thus, e.g., it can be a model of a technical system with which the control unit and/or the technical system to be controlled interact. It can also be a model of an even more remote technical system that interacts with the control unit and/or the technical system to be controlled via intermediate technical systems. Depending on the desired depth of detail of a test, different steps of environment models can be incorporated.

Exemplary embodiments of the invention further comprise a method for testing a control unit or a control unit model with a simulation device, wherein the control unit or the control unit model interacts with a compatible model of a technical system, said model being present on the simulation device, wherein the method comprises the following steps: (a) executing the compatible model on the simulation device, wherein the compatible model is a compatible container unit in which a simulation-device-incompatible model of the technical system and a virtual execution environment are embedded, (b) addressing the compatible model by the control unit or control unit model by means of interface calls directed to the compatible container unit, and (c) converting the interface calls into customized interface calls, wherein the virtual execution environment addresses the incompatible model of the technical system by means of the customized interface calls.

The method of the invention for testing a control unit or control unit model enables the seamless addressing of an originally incompatible model of a technical system during the simulation. By converting the interface calls into customized interface calls for the virtual execution environment, the simulation device can address the originally incompatible model as if it were a model that was compatible from the outset. The simulation device can perform a test in the usual way without any special customization. It is possible in this case that the method is used both when testing a control unit, i.e., when testing a hardware implementation of a control, e.g., as part of an HIL simulation, as well as when testing a control unit model, i.e., when testing a software model of a control, e.g., as part of an RCP test.

According to a further embodiment, step (c) comprises converting the interface calls into customized interface calls by means of an interface bridge between the compatible container unit and the virtual execution environment. In this way, an effective coupling can be provided between the external interface of the virtual execution environment and the internal interface of the compatible container unit.

According to a further embodiment, the method further comprises the following steps: (d) addressing the control unit or control unit model by the incompatible model by means of second interface calls directed to the virtual execution environment; and (e) converting the second interface calls into second customized interface calls, wherein the compatible container unit addresses the control unit or the control unit model using the second customized interface calls. In this way, the incompatible model may address the control unit or control unit model in the manner inherent in the incompatible model, wherein compatibility to the control unit or control unit model is again provided by converting the interface calls. The second customized interface calls are compatible with the simulation device and thus enable interaction with models existing on the simulation device as well as devices connected to the simulation device, such as, e.g., control units or technical systems to be controlled.

According to a further embodiment, step (e) comprises converting the second interface calls into second customized interface calls by means of an interface bridge between the virtual execution environment and the compatible container unit. The interface bridge referred to herein may be an interface bridge in addition to the interface bridge discussed above with respect to step (c). It is also possible that it is the same interface bridge, which is then bidirectional.

Generally, it is disclosed herewith that the additional features, modifications, and effects which were described above with respect to the method for creating a simulation-device-compatible model of a technical system apply analogously to the method for testing a control unit or a control unit model with a simulation device and can be used analogously thereon. In particular, the following embodiments are explicitly set forth for the method for testing a control unit or a control unit model with a simulation device.

According to a further embodiment, the compatible container unit is designed according to an interface standard, in particular according to the Functional Mock-up Interface (FMI) standard.

According to a further embodiment, the incompatible model of the technical system has a precompiled model of the technical system embedded in an output container unit.

According to a further embodiment, the output container unit is designed according to an interface standard, in particular according to the Functional Mock-up Interface (FMI) standard.

According to a further embodiment, the compatible model of the technical system is an environment model for a control unit, in particular a model of a technical system to be controlled.

Exemplary embodiments of the invention further comprise a container unit compatible with a simulation device, wherein the simulation device is a simulation device set up for control unit development and wherein the compatible container unit forms a compatible model of a technical system executable on the simulation device, wherein the compatible container unit contains: a simulation-device-incompatible model of the technical system and a virtual execution environment in which the incompatible model of the technical system is executable, wherein the incompatible model of the technical system is addressable via the compatible container unit and the virtual execution environment on the simulation device. The additional features, modifications, and effects which were described above with respect to the method for creating a simulation-device-compatible model of a technical system and with respect to the method for testing a control unit or control unit model with a simulation device apply analogously to the container unit compatible with a simulation device and can be used analogously thereon.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
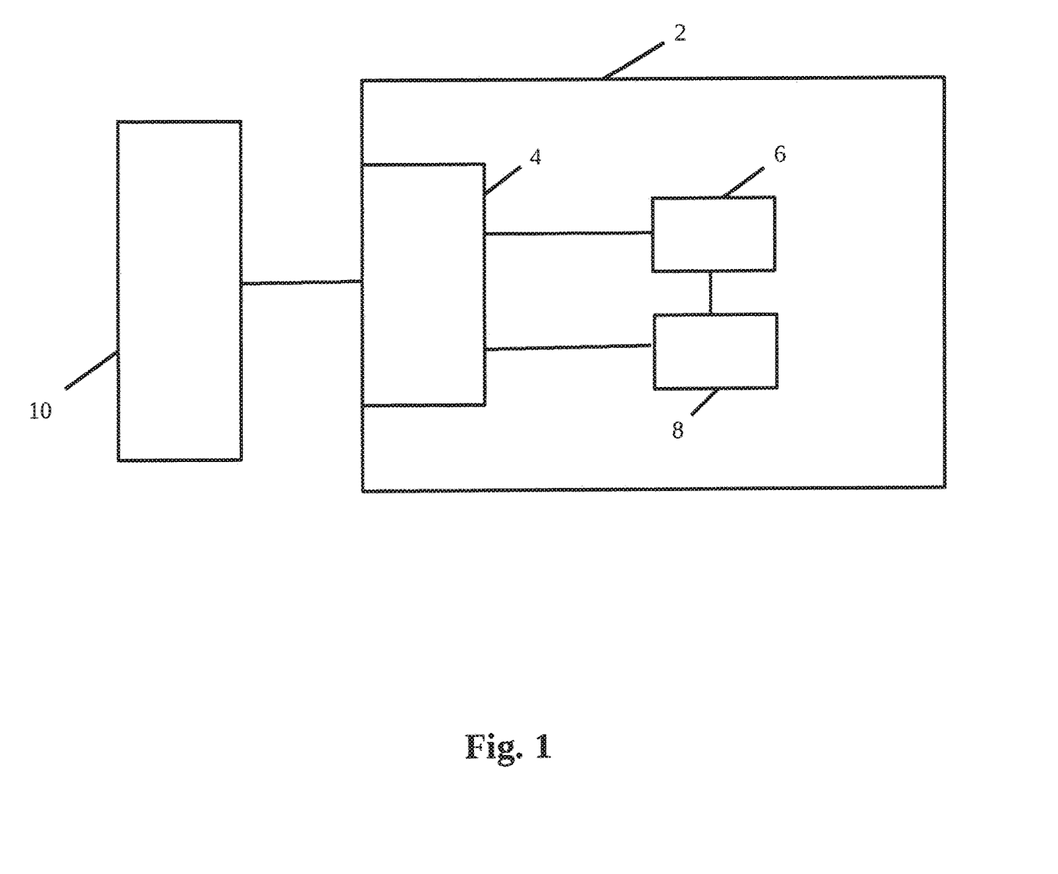
FIG. 1 shows in a block diagram a simulation device with a control unit to be tested and connected thereto, wherein the simulation device is designed to carry out a method for testing a control unit according to exemplary embodiments of the invention.

FIG. 1 shows a simulation device 2, which in the present case is a HIL simulator 2. HIL simulator 2 has a physical interface 4 via which external devices can be connected to HIL simulator 2. In FIG. 1, an engine control unit 10 is connected to physical interface 4. HIL simulator 2 is set up for testing engine control unit 10.

HIL simulator 2 includes a model 6 of an engine. Model 6 of the engine is a model of a system to be controlled. In particular, model 6 of the engine is a model of the technical system to be controlled by engine control unit 10. Model 6 of the engine is available as a software model and can exchange data with physical interface 4. This results in a data connection between engine control unit 10 and model 6 of the engine, by which the interaction of these two components can be simulated and tested. In this case, physical interface 4 takes over the transition between the physical signals transmitted from and to the control unit and the logical, i.e., software-based, signals exchanged within HIL simulator 2.

Furthermore, HIL simulator 2 includes a model 8 of a transmission. Model 8 of the transmission is also incorporated in the test of engine control unit 10. Thus, engine control unit 10 is tested in interaction with model 6 of the engine and further in interaction with model 8 of the transmission. Model 8 of the transmission is connected to model 6 of the engine and connected to engine control unit 10 via physical interface 4. Thus, interactions between the transmission and engine can be simulated and the coupling between the transmission and engine control unit, which coupling is often present in reality, can be mapped. In this way, a more realistic and more comprehensive test of engine control unit 10 is possible than if model 8 of the transmission were not present. For the clearest possible illustration of an exemplary embodiment of the invention, only the interaction of engine control unit 10, engine, and transmission is shown in FIG. 1. However, it will be apparent to the skilled artisan that other models of technical systems, which can interact with engine control unit 10 and/or with the models already described, may be present in the HIL simulator.

Instead of engine control unit 10, a model of the engine control may also be present. In this case, the interaction of engine control, engine, and transmission can be simulated using models of all three components. It is possible, furthermore, that models of the engine control and transmission are present and their behavior is tested when connected to a real engine.

Figure 2:
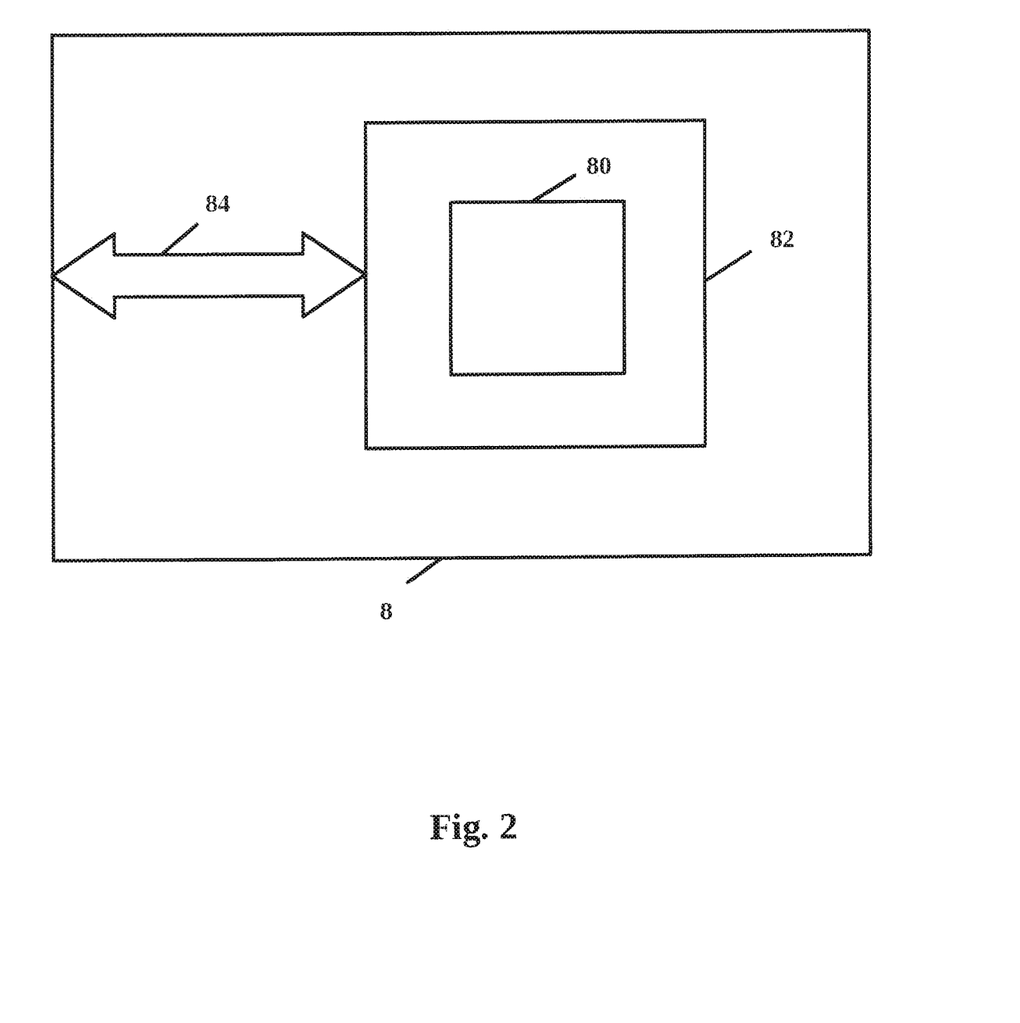
FIG. 2 shows in a block diagram a compatible model of a technical system according to an exemplary embodiment of the invention, wherein the compatible model is the result of a method for creating a model compatible with a simulation device according to exemplary embodiments of the invention.

FIG. 2 shows model 8 of the transmission, which is provided in the HIL simulator of FIG. 1, in a block diagram with further details. Model 8 of the transmission is a technical system model compatible with simulation device 2. As a compatible model, model 8 of the transmission can be executed on simulation device 2, i.e., on HIL simulator 2. Operating system 2 of HIL simulator 2 can address compatible model 8 of the transmission and readily interact with it. Compatible model 8 of the transmission contains encapsulated components as described below. Therefore, compatible model 8 of the transmission can also be described and referred to as a compatible container unit.

Compatible model 8 of the transmission has a transmission model 80 that is incompatible with simulation device 2. Incompatible model 80 of the transmission is incompatible with simulation device 2 in that it cannot be executed on simulation device 2. Incompatible model 80 of the transmission is a precompiled model that has been compiled for an operating system other than the operating system of simulation device 2. The virtual execution environment is also referred to as the runtime platform for the incompatible model of the technical system. In contrast, the simulation device or the operating system of the simulation device is the target platform on which the compatible model of the technical system is addressed.

Compatible model 8 of the transmission further has a virtual execution environment 82 in which incompatible model 80 of the transmission can be executed. From the perspective of incompatible model 80 of the transmission, virtual execution environment 82 behaves like hardware on which the precompiled model can be executed. However, virtual execution environment 82 is software that emulates such compatible hardware for incompatible model 80. This software in turn runs on simulation device 2. For this purpose, virtual execution environment 82 can use the resources of the simulation device, in particular the processor(s) and the memory of the simulation device.

Compatible model 8 of the transmission further has an interface bridge 84. In the present example, interface bridge 84 is bidirectional. Interface bridge 84 is an example of a structure that enables communication between virtual execution environment 82 and the other components of simulation device 2, such as, e.g., model 6 of the engine and physical interface 4. Interface bridge 84 connects the external interface of virtual execution environment 82 to the internal interface of compatible model 8 of the transmission. Communication of compatible model 8 of the transmission to the outside continues to be possible via this internal interface.

Compatible model 8 of the transmission can be created, for example, in the following manner. Incompatible model 80 of the transmission is provided. For example, incompatible model 80 of the transmission may be loaded or retrieved from a database of available precompiled models. Virtual execution environment 82 is provided. In order for incompatible model 80 of the transmission to be linked with and executed in the execution environment, incompatible model 80 of the transmission may be loaded into virtual execution environment 82, for example, with an import tool. Incompatible model 80 of the transmission and virtual execution environment 82 are encapsulated in a compatible container unit, which represents compatible model 8 of the transmission. Here, interface bridge 84 is provided which, for later simulation, enables the conversion of interface calls to/from the outside of compatible model 8 of the transmission and interface calls to/from incompatible model 80 of the transmission, wherein the interface calls mentioned second can be processed by virtual execution environment 82.

Figure 3:
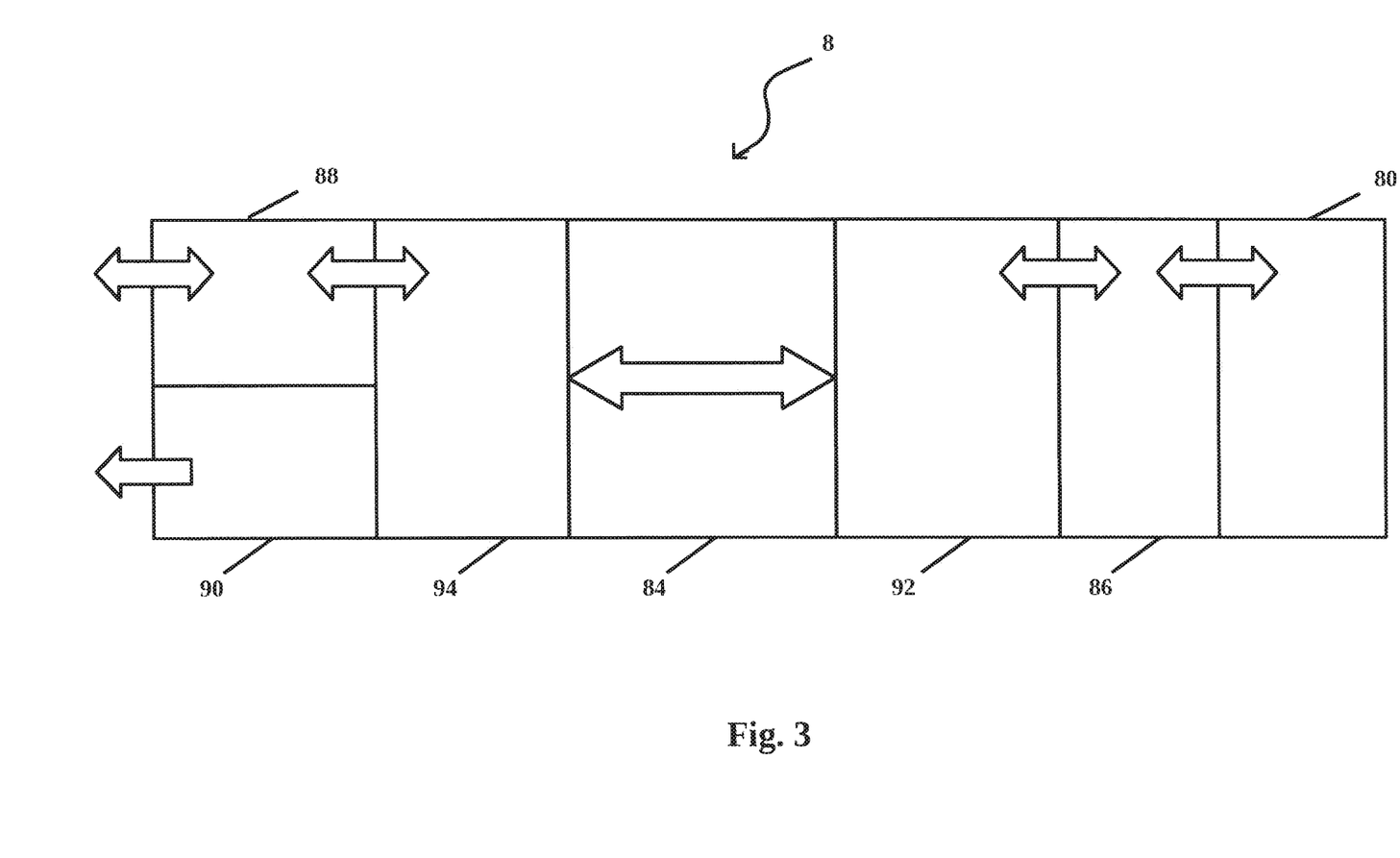
FIG. 3 illustrates the data flow in a compatible model of a technical system according to an exemplary embodiment of the invention in a block diagram.

FIG. 3 illustrates in a block diagram the data flow in compatible model 8 of the transmission, as can occur during a test of a control unit, for example. The entirety of the blocks of FIG. 3 represents compatible model 8 of the transmission. Incompatible model 80 of the transmission is at the "back" end of the data flow. Incompatible model 80 of the transmission includes an output container unit in which the precompiled model is embedded. The output container unit is designed and organized according to the Functional Mock-up Interface standard. According to this standard, the output container unit has an interface for interface calls as well as a high-level language description of the interfaces and the environment-relevant internal parameters of the embedded model. In the example of the transmission, such an internal parameter is, e.g., the engaged gear. Incompatible model 80 communicates via the interface of the output container unit by means of customized interface calls 86, as described below.

The mentioned high-level language description of the interfaces and parameters of incompatible model 80 is also provided at the "front" end of compatible model 8 of the transmission. There, said high-level language description of the interfaces and parameters is provided with reference character 90. In constructing compatible model 8 of the transmission, the high-level language description of the interfaces and parameters 90 from the output container unit, constituting incompatible model 80 of the transmission, is copied into compatible model 8 of the transmission. In this way, the interfaces and parameters can be seen in a high-level language description for the other components of simulation device 2.

Furthermore, compatible model 8 of the transmission communicates with the other components of simulation device 2 via interface calls 88. Interface calls 88 are such that they are compatible with the other components of simulation device 2 and can be processed on simulation device 2. Compatible model 8 of the transmission is also designed according to the Functional Mock-up Interface standard. At its "front" end, compatible model 8 of the transmission has the described interface for interface calls 88 as well as the described high-level language description of interfaces and parameters 90.

Interface bridge 84 is provided to convert interface calls 88 and customized interface calls 86. Customized interface calls 86 are designated as customized to distinguish them from interface calls 88 and to express that they are modified as compared with the interface calls processable by simulation device 2, so that they can be processed by incompatible model 80 of the transmission. Depending on the data flow direction, interface calls 88 may also be designated as customized interface calls for interface calls originating from incompatible model 80.

Interface bridge 84 is surrounded by a first shell function 92 and a second shell function 94. First shell function 92 and second shell function 94 have the task of packing or unpacking interface calls 88 and customized interface calls 86 such that they can be processed by interface bridge 84 after packing in a defined format or after unpacking are in the format expected by incompatible model 80 of the transmission or by the environment of compatible model 8 of the transmission. In interface bridge 84, the conversion or transformation takes place between interface calls 88 that are processable by simulation device 2 and compatible model 8 of the transmission and interface calls 86 that are processable by incompatible model 80. Thus, the data flow in FIG. 3 is an example of how a seamless interaction between simulation device 2 and the originally incompatible model 80 of a technical system is made possible.

It is emphasized that the reference to a transmission is purely exemplary and has been chosen for purposes of illustration only. The described encapsulation of an incompatible model of a technical system and the achievable possibility of seamless interaction with the originally incompatible model is independent of the specific technical system being modeled.

Interface calls 88 and customized interface calls 86 may be Application Programming Interface (API) interface calls. Interface bridge 84 may also be considered as a means for synchronizing the interface calls. Furthermore, an optimization of the interaction can take place in interface bridge 84. For example, associated interface calls can be bundled by means of an internal buffer and these are then passed on to the virtual execution environment or to the simulation device for joint processing.

Although the invention has been described with reference to exemplary embodiments, it is apparent to a skilled artisan that various changes may be made and equivalents may be employed without going beyond the scope of the invention. The invention should not be limited by the specific embodiments described. Rather, it includes all embodiments that fall under the appended claims.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for creating a model of a technical system, the model being compatible with a simulation device, wherein the simulation device is a simulation device set up for control unit development and the compatible model is executable on the simulation device, the method comprising:
    providing a simulation-device-incompatible model of the technical system;
    providing a virtual execution environment, wherein the simulation-device-incompatible model of the technical system is executable in the virtual execution environment; and
    encapsulating the simulation-device-incompatible model of the technical system and the virtual execution environment into a compatible container unit forming the compatible model of the technical system, the incompatible model of the technical system being addressable via the compatible container unit and the virtual execution environment on the simulation device, and coupling the compatible container unit and the virtual execution environment via an interface bridge,
    wherein the simulation-device-incompatible model of the technical system, when executed in the virtual execution environment and encapsulated in the compatible container, is compatible to be executed as the compatible model on the simulation device.

2. The method according to claim 1, wherein the compatible container unit has a standardized interface or has an interface according to the Functional Mock-up Interface (FMI) standard.

3. The method according to claim 1, wherein the virtual execution environment comprises an operating system on which the simulation-device-incompatible model of the technical system is executable,
    wherein the virtual execution environment has hardware components or software components required for executing the simulation-device-incompatible model that are not present on the simulation device, including a processor, a storage medium, a license mechanism, a simulation environment, or a database.

4. The method according to claim 1, wherein the incompatible model of the technical system has a precompiled model of the technical system embedded in an output container unit.

5. The method according to claim 4, wherein the output container unit has a standardized interface or has an interface according to the Functional Mock-up Interface (FMI) specification.

6. The method according to claim 1, wherein the incompatible model of the technical system is an environment model for a control device or a model of a technical system to be controlled.

7. The method according to claim 1, wherein the simulation device is a hardware-in-the-loop simulator or a PC-based simulation platform for securing software of an electronic control unit.

8. The method according to claim 1, wherein the incompatible model is a software model of a technical system, and wherein the software model is a machine code or binary code for an operating system or a processor architecture.

9. A method for testing a control unit or a control unit model with a simulation device, the control unit or the control unit model interacting with a compatible model of a technical system, the compatible model being present on the simulation device, the method comprising:
    executing the compatible model on the simulation device, the compatible model being a compatible container unit in which a simulation-device-incompatible model of the technical system and a virtual execution environment are embedded, the simulation-device-incompatible model being executed in the virtual execution environment;
    addressing the compatible model by the control unit or control unit model via interface calls directed to the compatible container unit; and converting the interface calls into customized interface calls via an interface bridge between the compatible container unit and the virtual execution environment, wherein the virtual execution environment addresses the simulation-device-incompatible model of the technical system via the customized interface calls, wherein the simulation-device-incompatible model of the technical system, when executed in the virtual execution environment and encapsulated in the compatible container, is compatible to be executed as the compatible model on the simulation device.

10. The method according to claim 9, further comprising:

addressing the control unit or control unit model by the incompatible model via second interface calls directed to the virtual execution environment; and converting the second interface calls into second customized interface calls, wherein the compatible container unit addresses the control unit or the control unit model using the second customized interface calls.

11. The method according to claim 10, wherein the conversion of the second interface calls into second customized interface calls is performed via the interface bridge between the virtual execution environment and the compatible container unit.

12. The method according to claim 9, wherein the compatible container unit is designed according to an interface standard or according to a Functional Mock-up Interface (FMI) standard.

13. The method according to claim 9, wherein the incompatible model of the technical system has a precompiled model of the technical system embedded in an output container unit.

14. The method according to claim 9, wherein the compatible model of the technical system is an environment model for a control unit or a model of a technical system to be controlled.

15. A compatible container compatible with a simulation device and operating on a processor, the simulation device set up for control unit development and the compatible container forming a compatible model of a technical system executable on the simulation device, the compatible container comprising:

a simulation-device-incompatible model of the technical system; and a virtual execution environment in which the incompatible model of the technical system is executable, wherein the incompatible model of the technical system is addressable via the compatible container and the virtual execution environment on the simulation device and coupling the compatible container and the virtual execution environment via an interface bridge, wherein the simulation-device-incompatible model of the technical system, when executed in the virtual execution environment and encapsulated in the compatible container, is compatible to be executed as the compatible model on the simulation device.

* * * * *